US012756046B2

(12) United States Patent
Iemura et al.

(10) Patent No.: US 12,756,046 B2
(45) Date of Patent: Oct. 6, 2026

(54) BATTERY PACK

(71) Applicant: HONDA MOTOR CO., LTD., Tokyo (JP)

(72) Inventors: Yu Iemura, Saitama (JP); Ken Yasui, Saitama (JP); Satoru Kawabe, Saitama (JP); Masaaki Tatsuwaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 18/583,907

(22) Filed: Feb. 22, 2024

(65) Prior Publication Data

US 2024/0322319 A1 Sep. 26, 2024

(30) Foreign Application Priority Data

Mar. 22, 2023 (JP) ................................ 2023-045430

(51) Int. Cl.
*H01M 50/209* (2021.01)
*B60L 50/64* (2019.01)
(Continued)

(52) U.S. Cl.
CPC .......... *H01M 50/209* (2021.01); *B60L 50/64* (2019.02); *H01M 50/244* (2021.01);
(Continued)

(58) Field of Classification Search
CPC ............ H01M 50/209; H01M 50/244; H01M 50/249; H01M 50/282; H01M 50/291;
(Continued)

(56) References Cited

U.S. PATENT DOCUMENTS

2015/0174996 A1* 6/2015 Ikeda .................. H01M 8/2465 180/68.5
2018/0237075 A1* 8/2018 Kawabe .................. B60L 50/66

FOREIGN PATENT DOCUMENTS

JP 2013256265 A * 12/2013 .............. B60K 1/04
JP 2017196943 A * 11/2017
(Continued)

OTHER PUBLICATIONS

JP-2023102258-A English Translation (Year: 2023).*
(Continued)

*Primary Examiner* — Michael T. Walsh
(74) *Attorney, Agent, or Firm* — Paratus Law Group, PLLC

(57) ABSTRACT

A battery pack is mounted on a vehicle. The battery pack has a battery module including battery cells laminated in a first direction of a horizontal direction, and a load-bearing member extending in a second direction orthogonal to the first direction of the horizontal direction, and a battery case accommodating the battery module. The battery case includes a base plate, a frame member joined to an outer edge of the base plate and forming an outer frame of the battery case, a first fixing portion provided on the frame member at a position overlapped with the load-bearing member when viewed from the second direction and fixing a first part of the battery module to the frame member, and a second fixing portion provided on the frame member at a position different from the overlapped position and fixing a second part of the battery module to the frame member.

7 Claims, 15 Drawing Sheets

(51) Int. Cl.
*H01M 50/244* (2021.01)
*H01M 50/249* (2021.01)
*H01M 50/282* (2021.01)
*H01M 50/291* (2021.01)

(52) U.S. Cl.
CPC ....... *H01M 50/249* (2021.01); *H01M 50/282* (2021.01); *H01M 50/291* (2021.01); *H01M 2220/20* (2013.01)

(58) Field of Classification Search
CPC . H01M 2220/20; H01M 50/242; B60L 50/64; Y02E 60/10
See application file for complete search history.

(56) References Cited

FOREIGN PATENT DOCUMENTS

| | | | | | |
|---|---|---|---|---|---|
| JP | 2018-131133 | A | | 8/2018 | |
| JP | 2023102258 | A | * | 7/2023 | ............... B60K 1/04 |
| JP | 2024117496 | A | * | 8/2024 | |
| TH | 2201004561 | A | * | 4/2023 | |

OTHER PUBLICATIONS

TH-2201004561-A English Translation (Year: 2023).*
JP-2017196943-A English Translation (Year: 2017).*
JP-2013256265-A English Translation (Year: 2013).*
JP-2024117496-A English Translation (Year: 2024).*

* cited by examiner

BATTERY PACK

CROSS-REFERENCE TO RELATED APPLICATIONS

This application is based on and claims priority under 35 USC 119 from Japanese Patent Application No. 2023-045430 filed on Mar. 22, 2023, the entire content of which is incorporated herein by reference.

TECHNICAL FIELD

The present disclosure relates to a battery pack to be mounted on a vehicle.

BACKGROUND ART

In recent years, researches and developments have been conducted on a secondary battery (hereinafter, also referred to as a battery) that contributes to improvement in energy efficiency in order to allow more users to access affordable, reliable, sustainable, and advanced energy.

A large-capacity battery is mounted on a vehicle such as a battery type electric automobile, a hybrid vehicle, or a fuel cell vehicle. Since the battery mounted on such a vehicle is a high-voltage component, it is necessary to protect the battery from an impact. However, a large load may be input to the battery due to a vehicle collision or the like.

In this regard, for example, JP2018-131133A discloses a lower structure of a vehicle body capable of protecting a battery pack disposed below a floor panel at the time of a side collision of a vehicle. A battery side frame of the battery pack described in JP2018-131133A has a configuration that satisfactorily transmits a collision load to a battery cross member located on an inner side in a vehicle width direction.

A frame member forming an outer frame of the battery pack may be provided with a fixing portion for fixing a battery. In this case, a structure for appropriately protecting, when a collision load is input to the frame member, the battery from the collision load input to the battery via the fixing portion is desired.

SUMMARY OF INVENTION

The present disclosure provides a battery pack capable of appropriately protecting a battery module against a collision load input to a frame member on which a fixing portion for the battery module is provided.

An aspect of the present disclosure relates to a battery pack to be mounted on a vehicle, the battery pack including:

- a battery module including a plurality of battery cells laminated in a first direction of a horizontal direction, and a load-bearing member extending in a second direction, which is orthogonal to the first direction, of the horizontal direction; and
- a battery case accommodating the battery module,
- in which the battery case includes:
  - a base plate on which the battery module is placed;
  - a frame member joined to an outer edge of the base plate and forming an outer frame of the battery case;
  - a first fixing portion provided on the frame member at a position overlapping the load-bearing member when viewed from the second direction, and configured to fix a first part of the battery module to the frame member; and
  - a second fixing portion provided on the frame member at a position different from the position overlapping the load-bearing member when viewed from the second direction, and configured to fix a second part of the battery module to the frame member,
- a tip end of the base plate as viewed in a cross section of the outer edge is disposed below the frame member,
- the frame member includes a vertical wall portion located outward of the tip end of the base plate, and extending in an upper-lower direction such that the frame member overlaps the tip end of the base plate when viewed from the second direction, and
- the first fixing portion is configured to have a load transmission capacity to the battery module larger than a load transmission capacity of the second fixing portion when a load in the second direction is applied to the first fixing portion and the second fixing portion, and have a load-bearing capacity larger than a load-bearing capacity of the second fixing portion.

According to the present disclosure, the battery module can be appropriately protected against a collision load input to the frame member on which the fixing portion for the battery module is provided.

BRIEF DESCRIPTION OF DRAWINGS

Exemplary embodiment(s) of the present invention will be described in detail based on the following figures, wherein.

DESCRIPTION OF EMBODIMENTS

Figure 1:
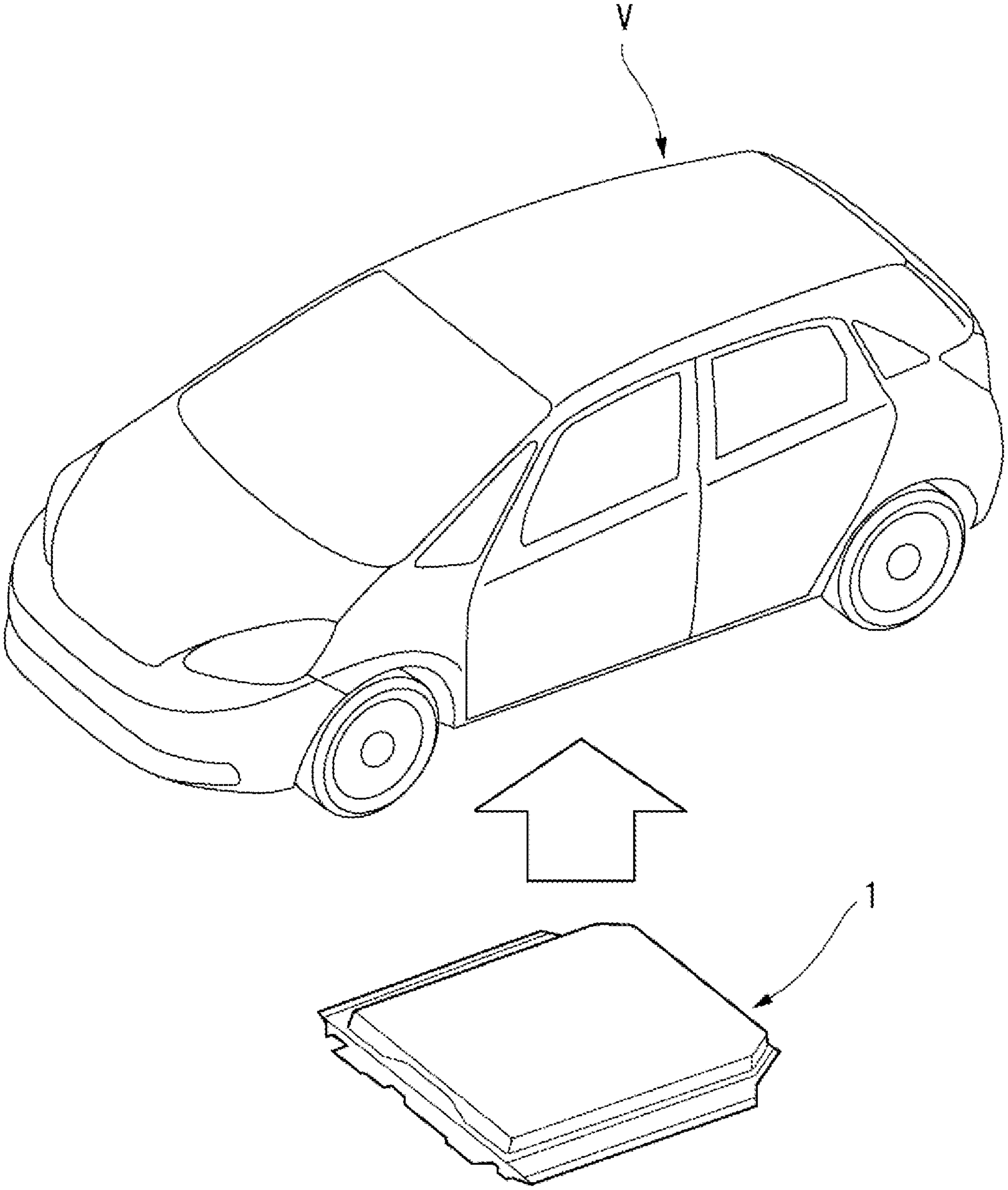
FIG. 1 is a perspective view of a battery pack 1 and a vehicle V on which the battery pack 1 is mounted.

Hereinafter, a battery pack according to an embodiment of the present disclosure will be described with reference to the accompanying drawings. The drawings are viewed from directions of reference numerals, and in the following description, directions such as front, rear, left, right, upper, and lower directions are described according to a direction viewed from a driver of a vehicle. In the drawings, a front side of the vehicle is denoted by Fr, a rear side is denoted by Rr, a left side is denoted by L, a right side is denoted by R, an upper side is denoted by U, and a lower side is denoted by D. Further, the left-right direction is also referred to as a vehicle width direction.

As shown in FIG. 1, a battery pack 1 according to an embodiment of the present disclosure is mounted on a vehicle V. The vehicle V is an electric vehicle such as a battery type electric automobile, a hybrid vehicle, or a fuel cell vehicle. The battery pack 1 is disposed below a floor panel of the vehicle V and attached to a vehicle body.

Figure 2:
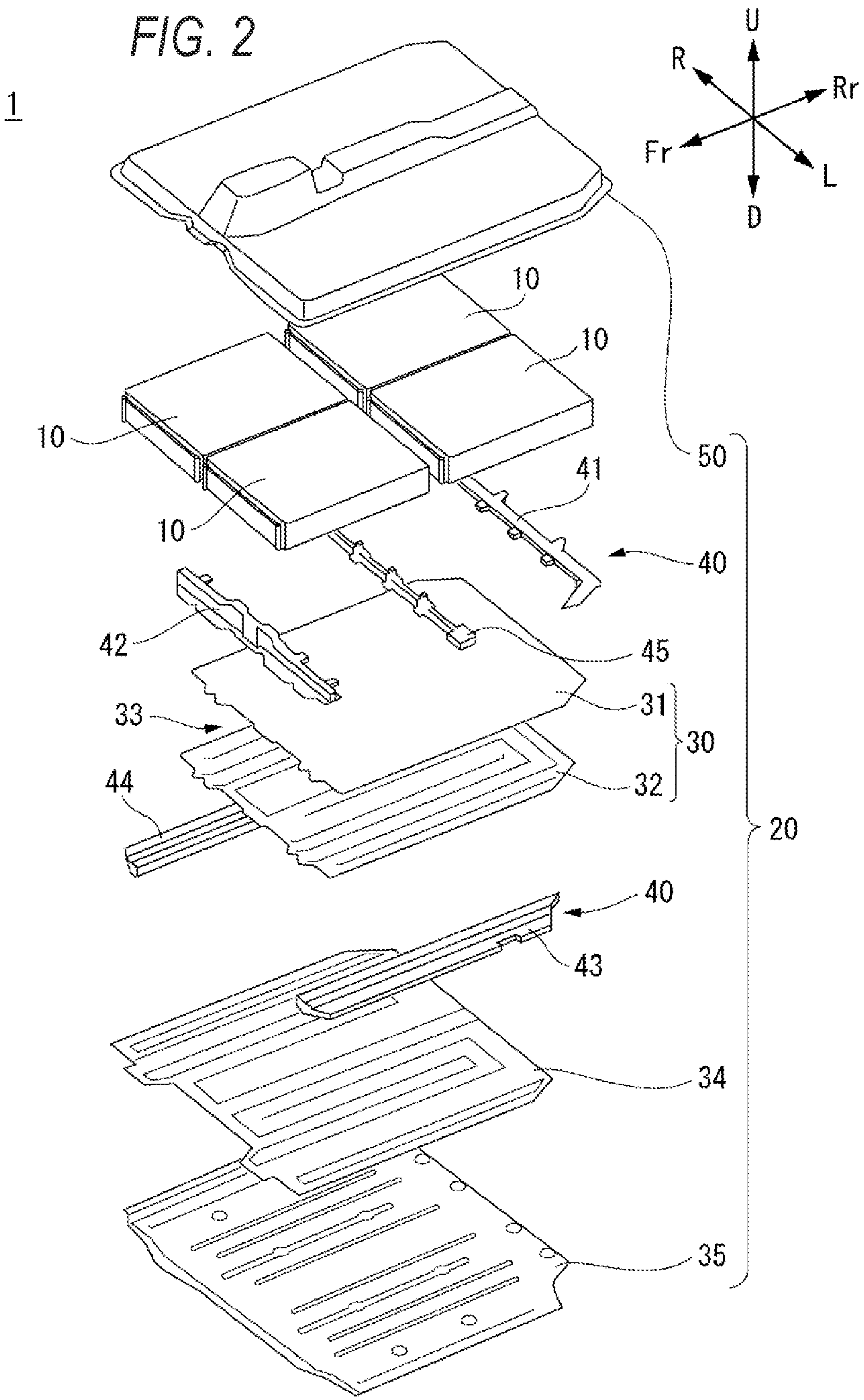
FIG. 2 is an exploded perspective view of the battery pack 1.

As shown in FIG. 2, the battery pack 1 includes four battery modules 10 and a battery case 20 that accommodates the battery modules 10.

(Battery Module)

The four battery modules 10 are arranged in two rows in a front-rear direction and in two rows in a left-right direction. The four battery modules 10 are electrically connected to one another via an electrical connection member (for example, a bus bar) that is not shown. The battery modules 10 store electric power to be supplied to a motor or the like serving as a drive source of the vehicle V. The number of battery modules 10 can be freely set, and an arrangement is also not particularly limited.

Figure 3:
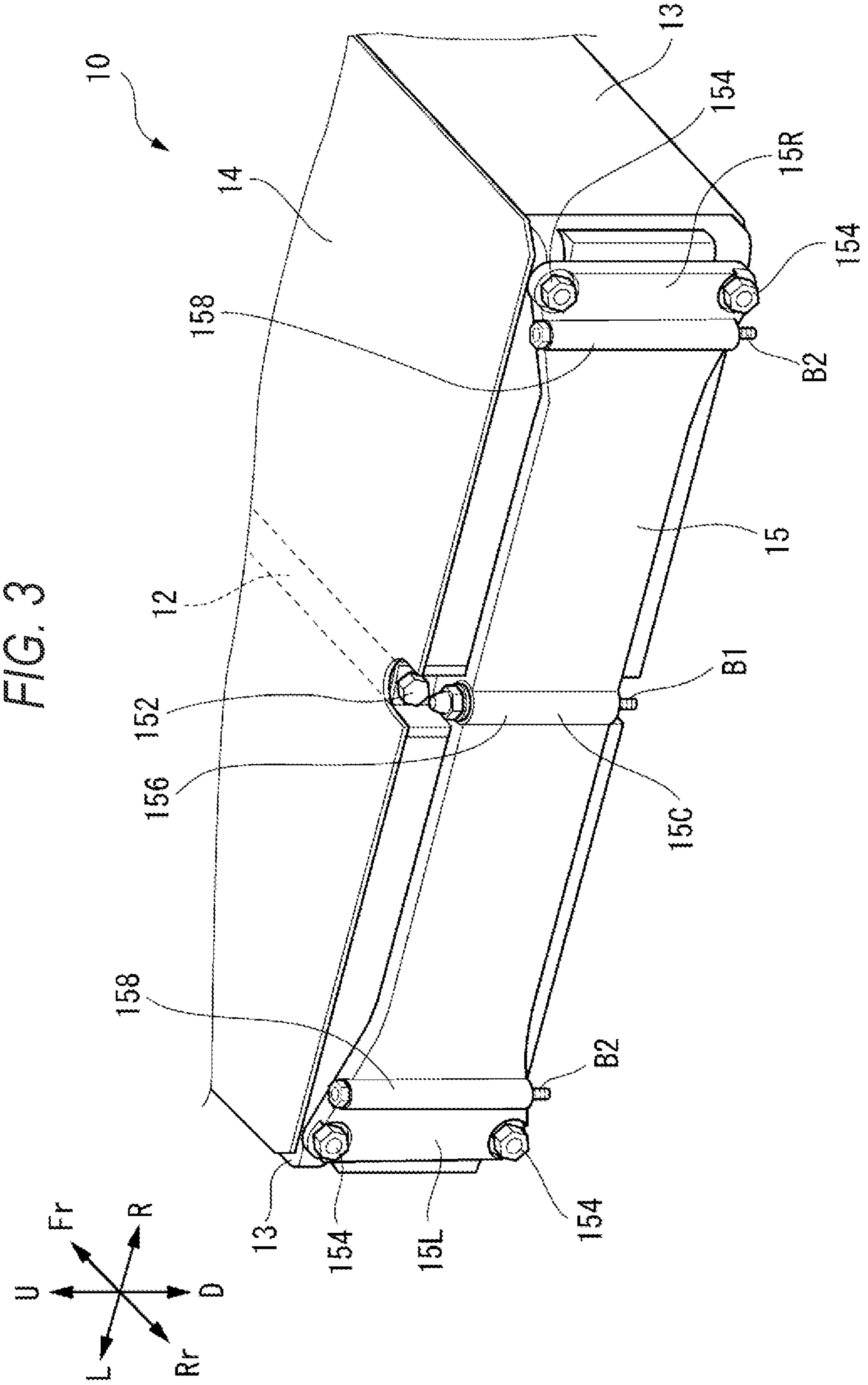
FIG. 3 is a partial perspective view of a battery module 10.
Figure 4:
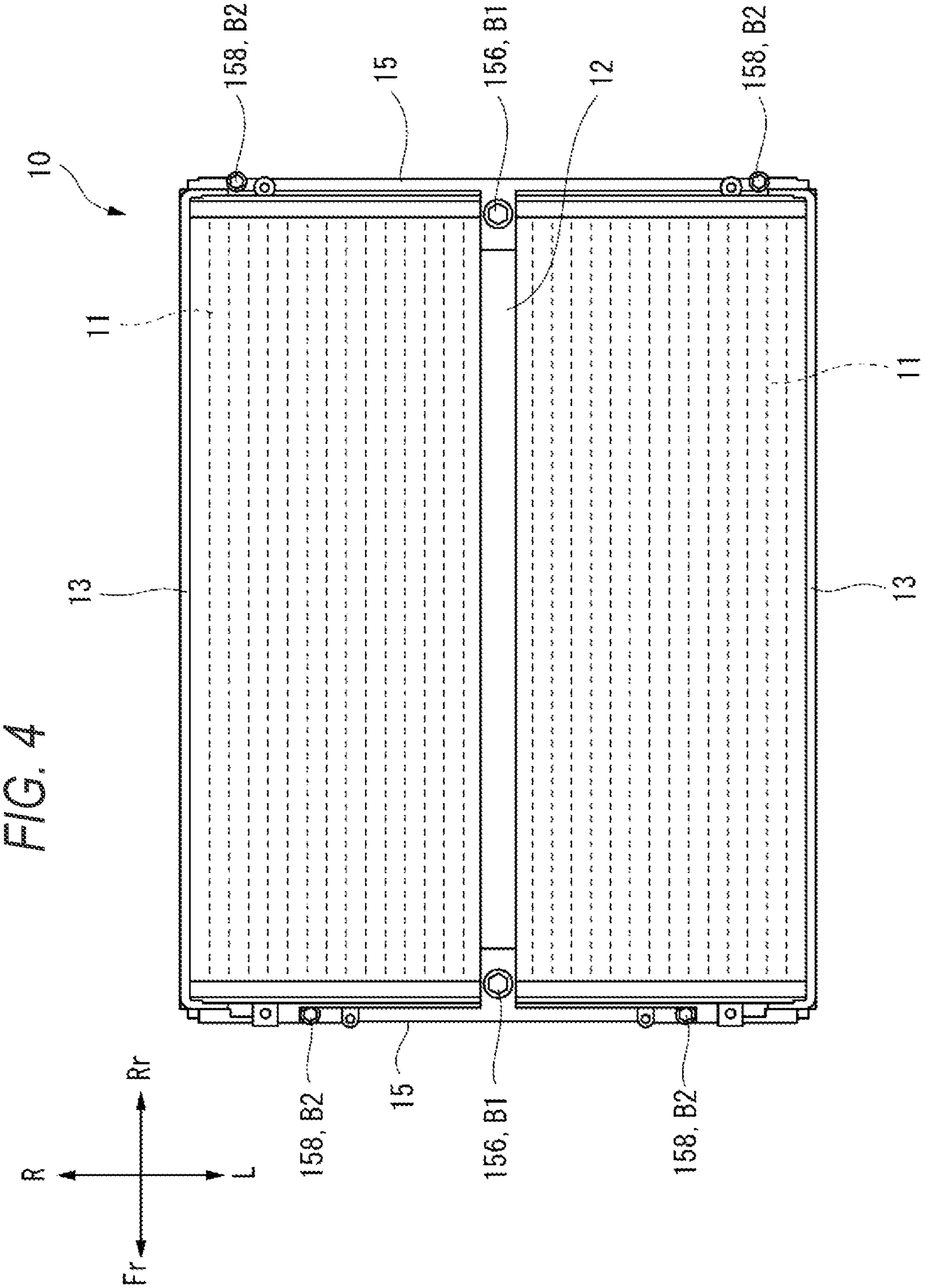
FIG. 4 is a top view of the battery module 10.

As shown in FIGS. 3 and 4, each of the battery modules 10 includes a plurality of battery cells 11, an intermediate plate 12, a pair of end plates 13, a pair of restraining members 14, and a pair of cover plates 15.

The battery cell 11 is, for example, a laminated cell made of a solid-state battery. In the present embodiment, the plurality of battery cells 11 are laminated in the left-right direction. The laminated cell includes a positive electrode to which a positive electrode tab is connected, a negative electrode to which a negative electrode tab is connected, a solid electrolyte disposed between the positive electrode and the negative electrode, and a laminated film that accommodates the positive electrode, the negative electrode, and the solid electrolyte, and the laminated cell performs charging and discharging by transferring ions (for example, lithium ions) between the positive electrode and the negative electrode via the solid electrolyte. Each battery cell 11 is not limited to the laminated type, and may be a square or cylindrical type, and the electrolyte may be liquid or solid.

The intermediate plate 12 is provided at an intermediate portion in a lamination direction (here, the left-right direction) of the plurality of battery cells 11, and extends in a direction (here, the front-rear direction) orthogonal to the lamination direction. The intermediate plate 12 is a member having a larger load-bearing capacity than the plurality of battery cells 11, and is an example of a load-bearing member of the present disclosure. Two or more intermediate plates 12 may be provided.

The pair of end plates 13 are provided at both ends in the lamination direction of the plurality of battery cells 11, and extend in a direction orthogonal to the lamination direction.

The pair of restraining members 14 face each other in an upper-lower direction, and are coupled to the pair of end plates 13 to restrain the plurality of battery cells 11. The pair of restraining members 14 each have a plate shape and cover the plurality of battery cells 11, the intermediate plate 12, and the pair of end plates 13 from the upper-lower direction.

The pair of cover plates 15 are provided outward of the plurality of battery cells 11 in the front-rear direction and extend in the lamination direction.

The cover plate 15 includes an intermediate plate coupling portion 152 provided at a central portion 15C in a longitudinal direction (here, the left-right direction) and coupled to the intermediate plate 12; and end plate coupling portions 154 provided at a left end portion 15L and a right end portion 15R in the longitudinal direction and coupled to the pair of end plates 13.

A first fixing portion 156 through which a bolt B1 can be inserted from above is provided in the central portion 15C of the cover plate 15. The first fixing portion 156 of the cover plate 15 is fixed to a first fixing portion 60 of the battery case 20 to be described later by the bolt B1. Similarly, second fixing portions 158 through each of which a bolt B2 can be inserted from above are respectively provided between the central portion 15C and the left end portion 15L of the cover plate 15 and between the central portion 15C and the right end portion 15R. The second fixing portions 158 of the cover plate 15 are fixed to second fixing portions 70 of the battery case 20 to be described later by the bolts B2. A diameter of the bolt B1 inserted through the first fixing portion 156 is larger than a diameter of the bolt B2 inserted through the second fixing portion 158.

(Battery Case)

Returning to FIG. 2, the battery case 20 includes a base plate 30 on which the battery modules 10 are placed, a frame member 40 forming an outer frame of the battery case 20, and a cover 50 covering the battery modules 10.

The base plate 30 is formed by pressing a metal material such as aluminum. The base plate 30 includes a bottom plate 31 on which the battery modules 10 are placed and a water jacket plate 32 provided below the bottom plate 31, and is configured by two plates overlapping in the upper-lower direction. A water jacket 33 through which a refrigerant (for example, cooling water) for cooling the battery modules 10 flows is formed between the bottom plate 31 and the water jacket plate 32 (see FIG. 7 and the like).

A heat insulating material 34 made of, for example, polypropylene foam is attached to the base plate 30 from below, and covers the water jacket 33 from below. Further, a lower cover 35 is attached to the base plate 30 from below the heat insulating material 34.

The frame member 40 is joined to an outer edge of the base plate 30 and forms the outer frame (that is, a rear wall, a front wall, a left wall, and a right wall) of the battery case 20. The frame member 40 is, for example, an aluminum casting. The frame member 40 is provided with a fastening portion to be fastened to the vehicle body by a bolt or the like.

The frame member 40 includes a rear cross member 41 provided at a rear edge of the base plate 30, a front cross member 42 provided at a front edge of the base plate 30, and a pair of side frames 43 and 44 provided at left and right edges of the base plate 30. The rear cross member 41 and the front cross member 42 extend in the left-right direction, and the pair of side frames 43 and 44 extend in the front-rear direction. The rear cross member 41 and the front cross member 42 are connected to the pair of side frames 43 and 44 by welding or the like.

Figure 5:
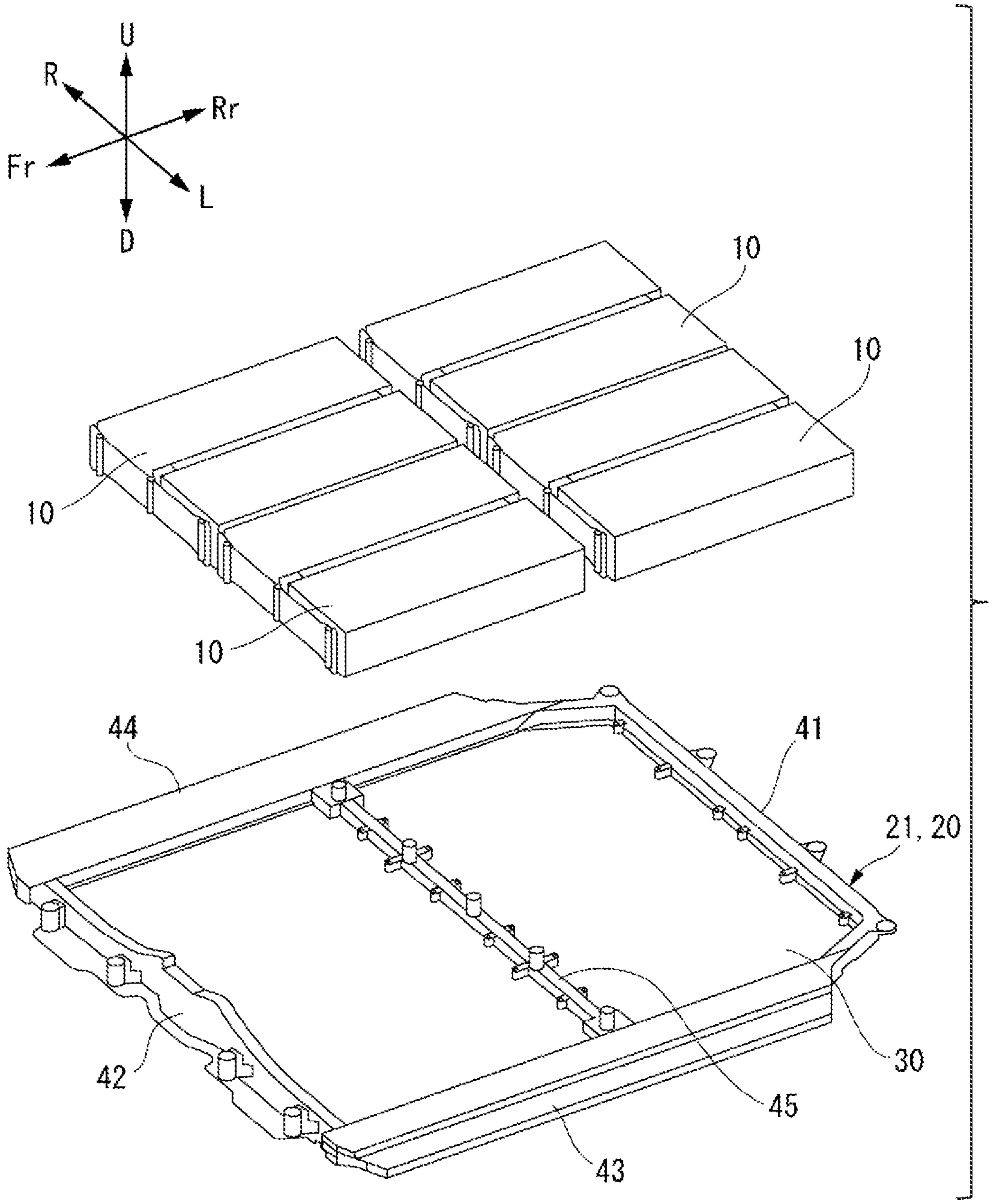
FIG. 5 is a perspective view showing a battery tray 21 and four battery modules 10 placed on the battery tray 21.

The rear cross member 41, the front cross member 42, and the pair of side frames 43 and 44 are joined to the outer edges of the base plate 30 by, for example, friction stir welding or welding, and form a lower portion of the battery case 20 as shown in FIG. 5, that is, a battery tray 21. The four battery modules 10 are placed on the battery tray 21.

The frame member 40 further includes a central cross member 45 extending in the left-right direction and provided at a central portion of the base plate 30 in the front-rear direction. The central cross member 45 is disposed between the two battery modules 10 disposed on the front side and the two battery modules 10 disposed on the rear side. The central cross member 45 is connected to the pair of side frames 43 and 44 by welding or the like.

Figure 6:
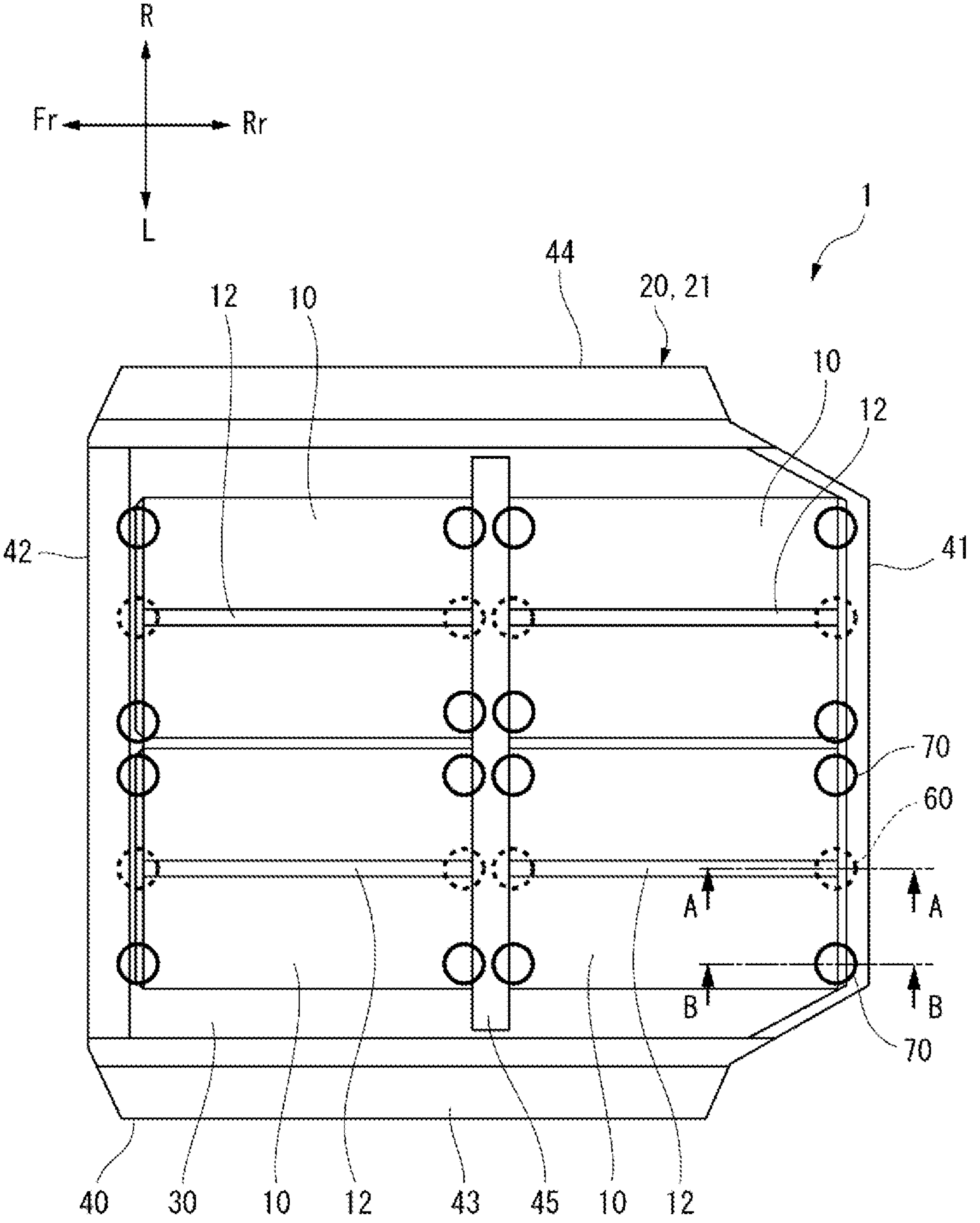
FIG. 6 is a top view showing an internal structure of the battery pack 1.

As shown in FIG. 6, the battery case 20 includes the first fixing portions 60 and the second fixing portion 70 that fix the battery modules 10 to the frame member 40. In FIG. 6, the first fixing portion 60 is indicated by a broken line circle, and the second fixing portion 70 is indicated by a solid line circle. In the present embodiment, the first fixing portions 60 and the second fixing portions 70 are provided on the rear cross member 41, the front cross member 42, and the central cross member 45.

The first fixing portion 60 is provided at a position overlapped with the intermediate plate 12 when viewed from the rear. The first fixing portions 60 of the battery case 20 fix the first fixing portions 156 of the cover plates 15 to the rear cross member 41, the front cross member 42, and the central cross member 45.

The second fixing portion 70 is provided at a position overlapped with the battery cell 11 when viewed from the rear. The second fixing portions 70 of the battery case 20 fix the second fixing portions 158 of the cover plates 15 to the rear cross member 41, the front cross member 42, and the central cross member 45.

After the four battery modules 10 are fixed to the battery tray 21, the cover 50 is attached to the frame member 40 from above via a sealing member (not shown). The cover 50 is attached to the frame member 40 by bolts, for example.

(First Fixing Portion and Second Fixing Portion)

Next, details of the first fixing portion 60 and the second fixing portion 70 of the battery case 20 will be described with reference to FIGS. 7 to 13. Hereinafter, the first fixing portion 60 and the second fixing portion 70 provided on the rear cross member 41 will be described, but the first fixing portion 60 and the second fixing portion 70 provided on each of the front cross member 42 and the central cross member 45 have similar configurations, so that description thereof will be omitted.

First, a specific configuration of the rear cross member 41 will be described.

Figure 7:
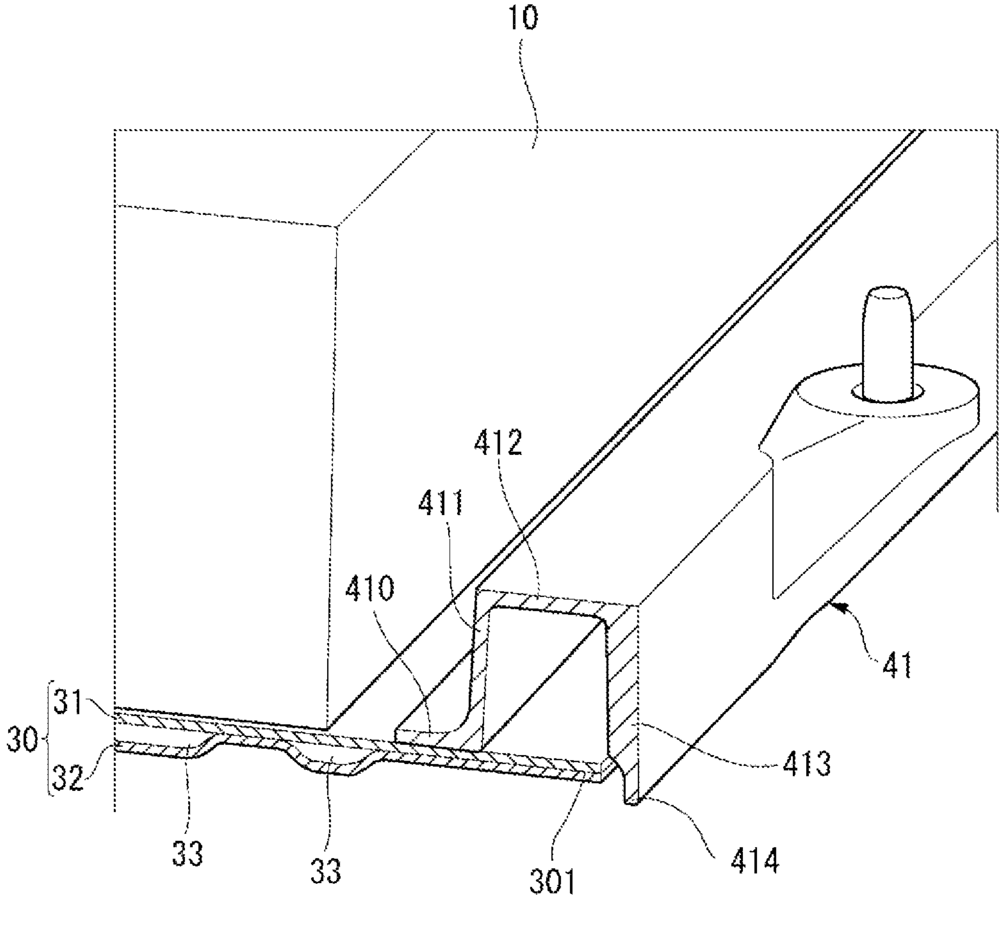
FIG. 7 is a perspective view of a cross section of a rear cross member 41 and a base plate 30.

As shown in FIG. 7, the rear cross member 41 includes a joint portion 410, an inner vertical wall portion 411, an upper wall portion 412, and an outer vertical wall portion 413. The joint portion 410 is a portion joined to an upper surface of the base plate 30. The rear cross member 41 and the base plate 30 are joined by, for example, friction stir welding or welding. The inner vertical wall portion 411 stands upward from the joint portion 410 and is located on an inner side of the battery case 20. The upper wall portion 412 extends in an outward direction of the battery case 20 from an upper end of the inner vertical wall portion 411. The upper wall portion 412 is abutted with a facing surface of the cover 50 when the cover 50 is attached. The outer vertical wall portion 413 is provided on an outer side of the battery case 20 and extends downward from the upper wall portion 412. The inner vertical wall portion 411, the upper wall portion 412, and the outer vertical wall portion 413 form a shape in which a cross section taken along a plane orthogonal to the longitudinal direction (left-right direction) of the rear cross member 41 is open downward.

A rear end 301 of the base plate 30 is disposed below the rear cross member 41. The outer vertical wall portion 413 of the rear cross member 41 is located outward of the rear end 301 of the base plate 30, and extends in the upper-lower direction such that the rear cross member 41 overlaps the rear end 301 of the base plate 30 when viewed from the rear. In other words, a lower end 414 of the outer vertical wall portion 413 is located downward of the rear end 301 of the base plate 30. In the present embodiment, the rear end 301 of the base plate 30 and the outer vertical wall portion 413 are preferably spaced apart from each other, or may be abutted with each other.

Next, specific configurations of the first fixing portion 60 and the second fixing portion 70 will be described.

Figure 8:
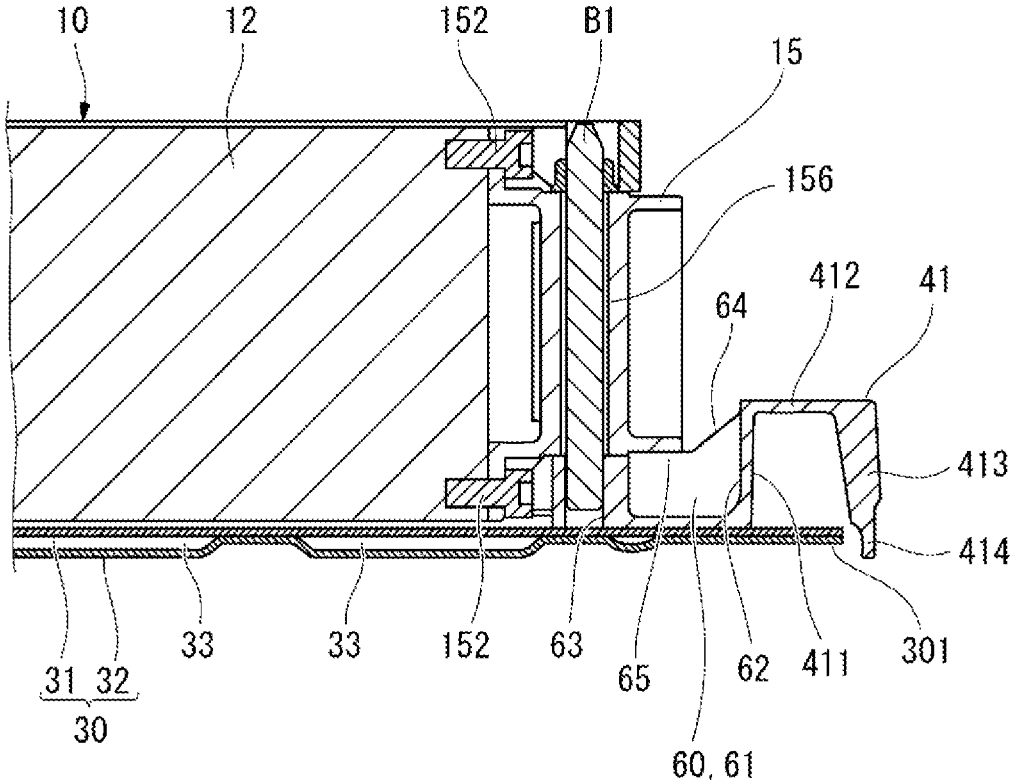
FIG. 8 is a cross-sectional view taken along a line A-A of FIG. 6.
Figure 9:
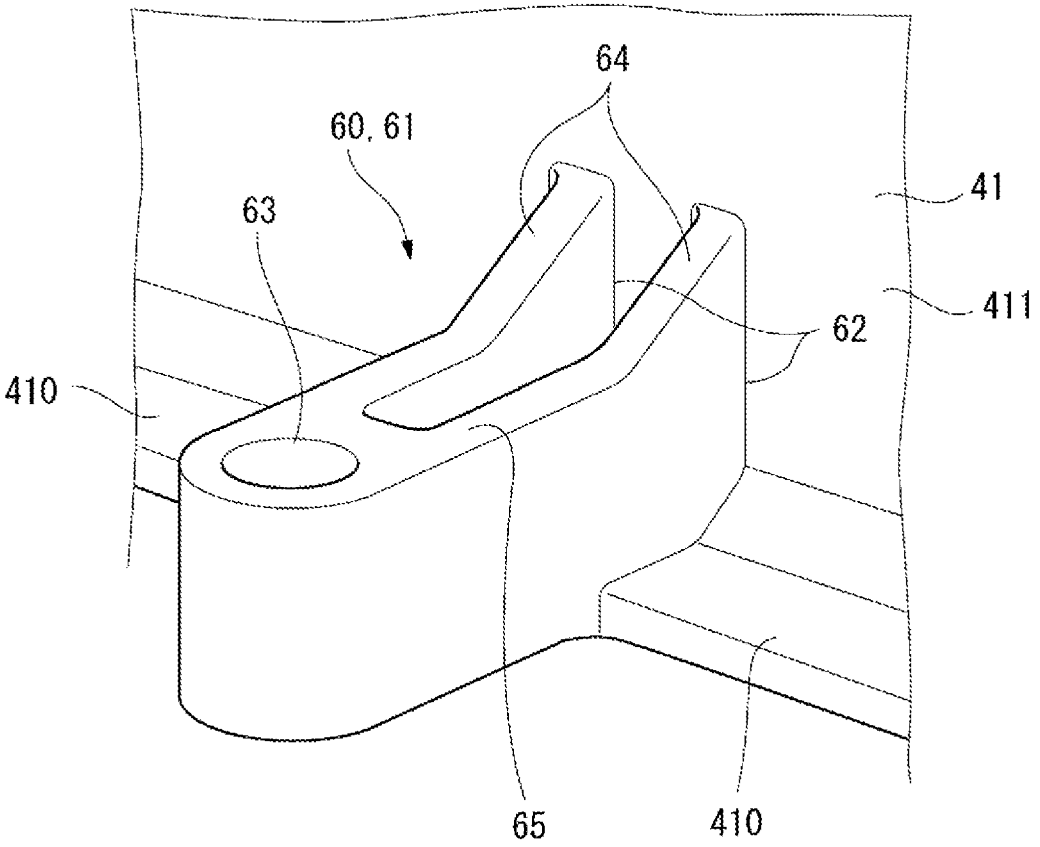
FIG. 9 is a perspective view of a first fixing portion 60.

FIG. 8 is a cross-sectional view taken along a line A-A of FIG. 6, and FIG. 9 is a perspective view of the first fixing portion 60. The first fixing portion 60 is configured as a first fixing bracket 61 extending from the rear cross member 41 toward the battery module 10.

The first fixing bracket 61 includes a coupling portion 62 coupled to the rear cross member 41 and a fastening portion 63 fastened to the first fixing portion 156 of the cover plate 15 by the bolt B1. The fastening portion 63 is a bolt hole. An upper portion of the first fixing bracket 61 includes, between the coupling portion 62 and the fastening portion 63, an inclined portion 64 inclined downward from the coupling portion 62 toward the inner side of the battery case 20, and a horizontal portion 65 extending horizontally from a lower end of the inclined portion 64 to the fastening portion 63.

Figure 10:
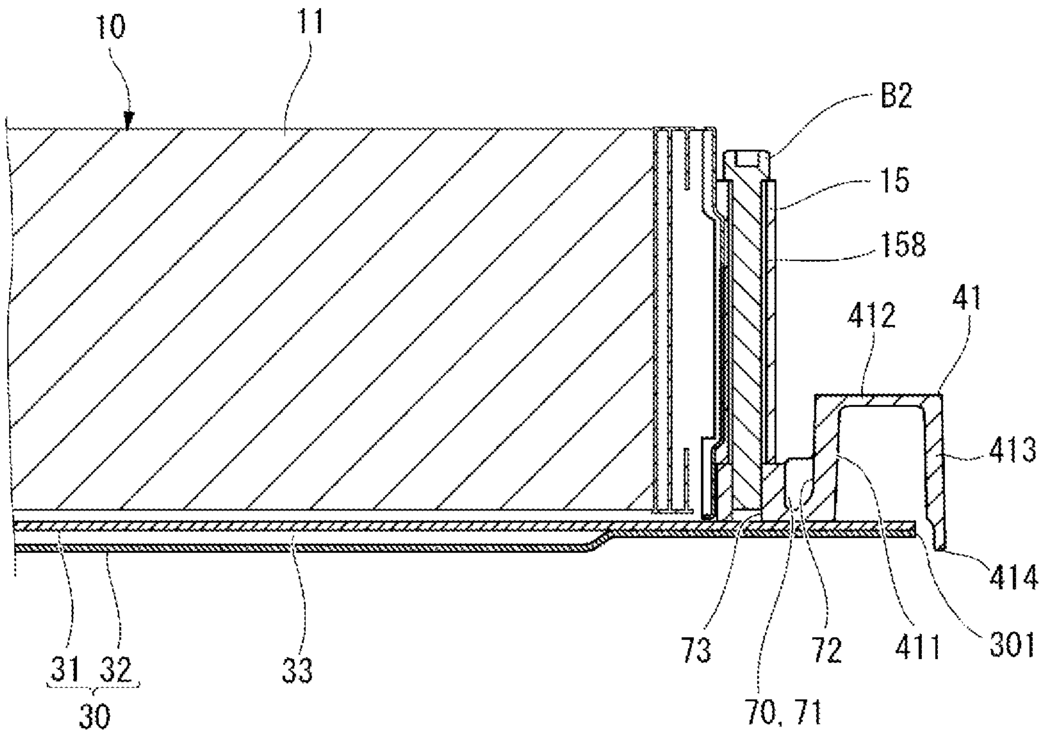
FIG. 10 is a cross-sectional view taken along a line B-B of FIG. 6.
Figure 11:
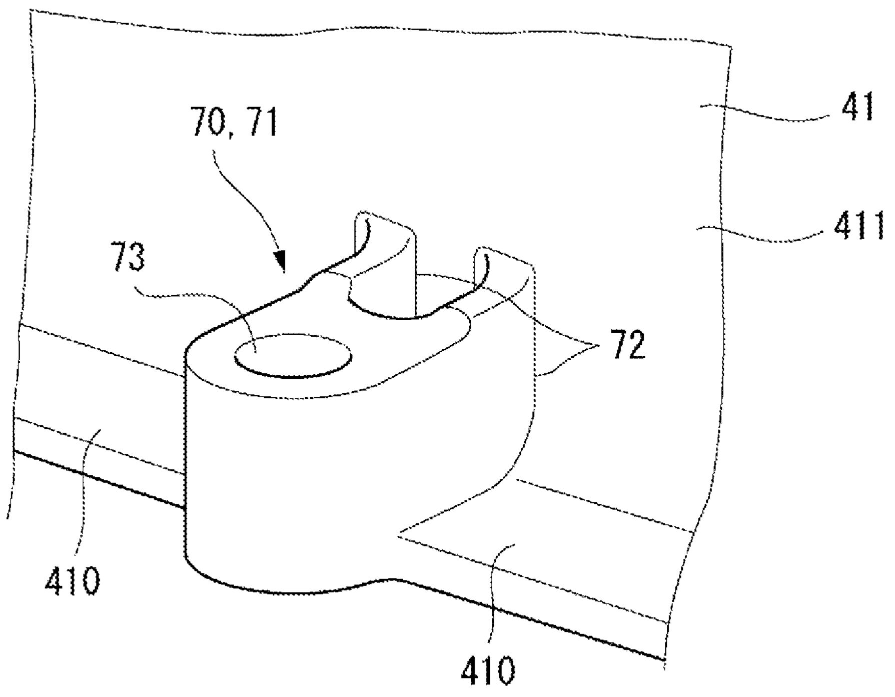
FIG. 11 is a perspective view of a second fixing portion 70.

FIG. 10 is a cross-sectional view taken along a line B-B of FIG. 6, and FIG. 11 is a perspective view of the second fixing portion 70. The second fixing portion 70 is configured as a second fixing bracket 71 extending from the rear cross member 41 toward the battery module 10.

The second fixing bracket 71 includes a coupling portion 72 coupled to the rear cross member 41 and a fastening portion 73 fastened to the second fixing portion 158 of the cover plate 15 by the bolt B2. The fastening portion 73 is a bolt hole. An upper portion of the second fixing bracket 71 is substantially horizontal from the coupling portion 72 to the fastening portion 73.

The first fixing bracket 61 and the second fixing bracket 71 are provided integrally with the rear cross member 41. Accordingly, the number of components can be reduced as compared with a case where the first fixing bracket 61 and the second fixing bracket 71 are provided separately from the rear cross member 41.

Next, transmission of a load from the first fixing portion 60 and the second fixing portion 70 to the battery module 10 when a collision load is input from the rear of the battery pack 1 will be described.

Figure 12:
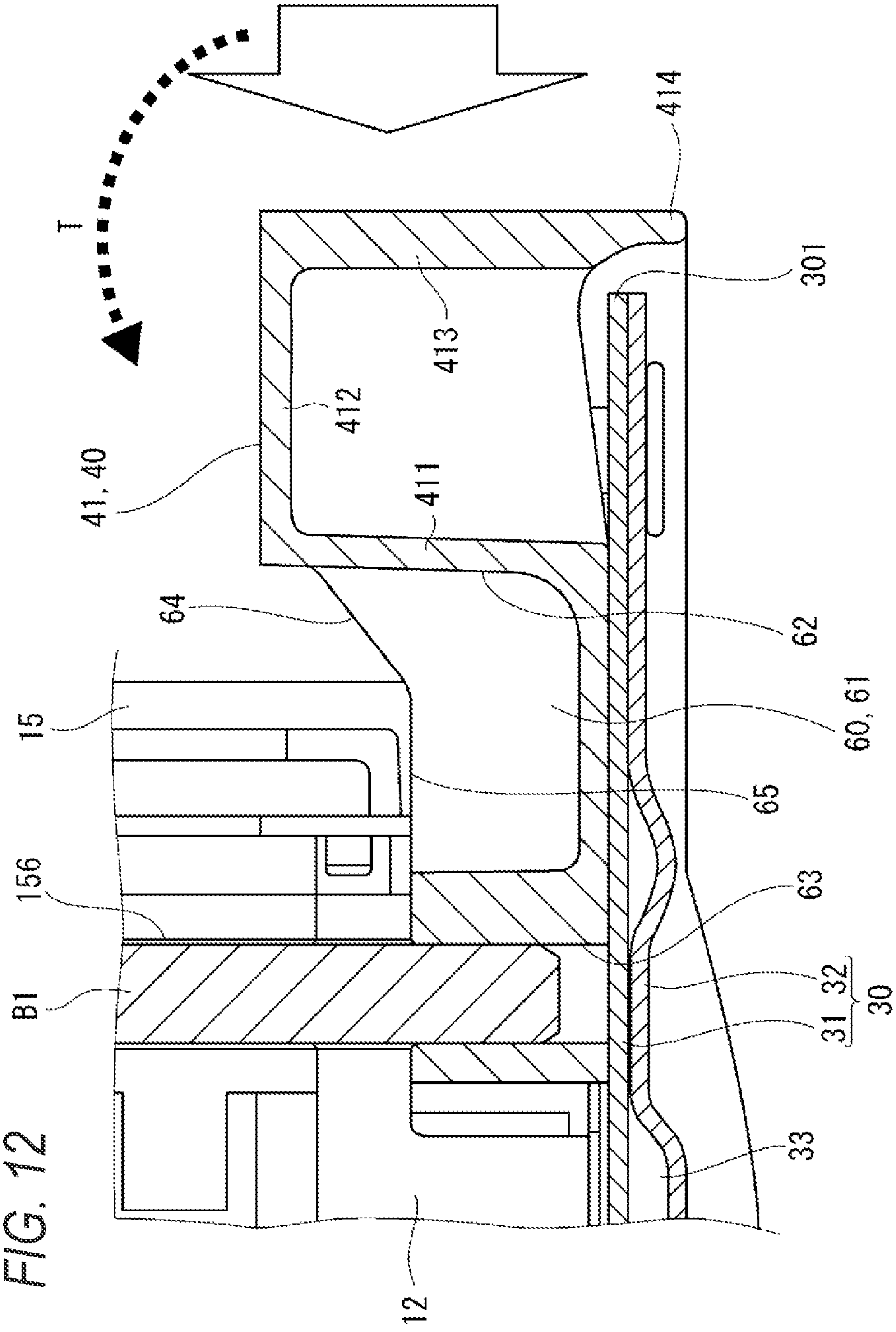
FIG. 12 is a view showing a rotational force T applied to the rear cross member 41 when a collision load is applied from the rear in the cross section taken along the line A-A of FIG. 6.
Figure 13:
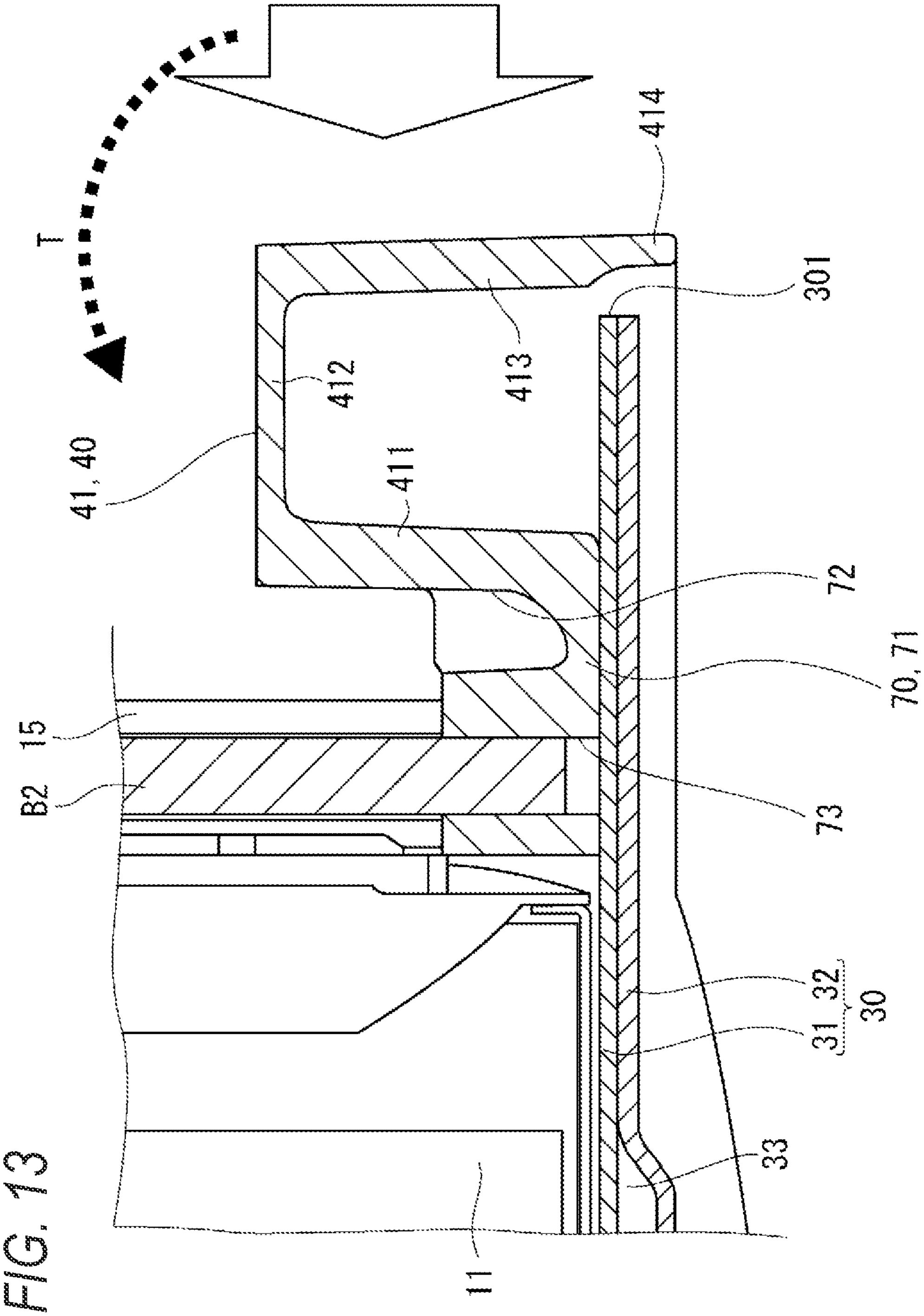
FIG. 13 is a view showing the rotational force T applied to the rear cross member 41 when the collision load is applied from the rear in the cross section taken along the line B-B of FIG. 6.

As shown in FIGS. 12 and 13, the rear end 301 of the base plate 30 is disposed below the rear cross member 41 when viewed in cross section. Further, the outer vertical wall portion 413 of the rear cross member 41 is located outward of the rear end 301 of the base plate 30, and extends in the upper-lower direction such that the rear cross member 41 overlaps the rear end 301 of the base plate 30 when viewed from the rear. According to such a configuration, when a collision load is input to the battery pack 1 from a vehicle rear side due to a collision of the vehicle V, the outer vertical wall portion 413 collides with the rear end 301 of the base plate 30, and a force T (hereinafter, also referred to as a rotational force T) rotating in an inward direction of the battery pack 1 around the rear end 301 of the base plate 30 is applied to the rear cross member 41. The rotational force T is transmitted to the battery module 10 via the first fixing portion 60 and the second fixing portion 70.

As described above, when viewed from the rear, the first fixing portion 60 is provided at a position overlapped with the intermediate plate 12, and the second fixing portion 70 is provided at a position overlapped with the battery cell 11.

When the rotational force T described above is transmitted to the battery module 10 via the first fixing portion 60 and the second fixing portion 70, it is desirable that most of the rotational force Tis transmitted to the intermediate plate 12 having a large load-bearing capacity in order to protect the battery cells 11.

In the present embodiment, the first fixing portion 60 has a load transmission capacity to the battery module 10 larger than a load transmission capacity of the second fixing portion 70. The load transmission capacity means the ability to receive the rotational force T of the rear cross member 41 and transmit the rotational force T to the battery module 10. That is, a load transmitted from the first fixing portion 60 to the battery module 10 is larger than a load transmitted from the second fixing portion 70 to the battery module 10.

Further, the first fixing portion 60 has a load-bearing capacity larger than a load-bearing capacity of the second fixing portion 70 in order to reliably transmit the load applied to the first fixing portion 60 to the intermediate plate 12. Since the first fixing portion 60 is disposed to be overlapped with the intermediate plate 12 having a large load-bearing capacity when viewed from the rear, most of the rotational force T applied to the rear cross member 41 due to the collision can be transmitted from the first fixing portion 60 to the intermediate plate 12. Accordingly, the battery module 10 can be appropriately protected.

Specifically, the first fixing portion 60 and the second fixing portion 70 are configured as the first fixing bracket 61 and the second fixing bracket 71 respectively, and a height of the coupling portion 62 of the first fixing bracket 61 is higher than a height of the coupling portion 72 of the second fixing bracket 71 in the upper-lower direction. With such a configuration, the load transmission capacity of the first fixing portion 60 can be made larger than the load transmission capacity of the second fixing portion 70. That is, the first fixing portion 60 can receive more rotational force T of the rear cross member 41 than the second fixing portion 70 and transmit the rotational force T from the first fixing portion 60 to the battery module 10.

The upper portion of the first fixing bracket 61 includes the inclined portion 64 that is inclined downward from the coupling portion 62 with the rear cross member 41 toward the inner side of the battery case 20. Since an inclination direction of the inclined portion 64 is substantially the same as a direction in which the rotational force T is applied to the rear cross member 41, stress concentration on a part of the first fixing bracket 61 can be prevented, for example, as compared with a case where the inclined portion 64 is not provided and a step portion extending in the vertical direction is provided between the coupling portion 62 and the fastening portion 63. Thus, the load-bearing capacity of the first fixing bracket 61 can be made larger.

Meanwhile, the upper portion of the second fixing bracket 71 is substantially horizontal from the coupling portion 72 with the rear cross member 41 to the fastening portion 73. The coupling portion 72 of the second fixing bracket 71 is lower in height than the coupling portion 62 of the first fixing bracket 61, and the upper portion of the second fixing bracket 71 is substantially horizontal, so that the second fixing bracket 71 has a smaller load transmission capacity to the battery module 10 than the first fixing bracket 61. That is, since the rotational force T of the rear cross member 41 transmitted from the second fixing bracket 71 to the battery module 10 is small, the battery cells 11 disposed to be overlapped with the second fixing bracket 71 when viewed from the rear are protected.

The first fixing bracket 61 is formed thicker than the second fixing bracket 71. Specifically, in the first fixing bracket 61 and the second fixing bracket 71, cutout portions are formed between the coupling portions 62 and 72 and the fastening portions 63 and 73, but in this region, the first fixing bracket 61 is formed thicker than the second fixing bracket 71. With such a configuration, the load-bearing capacity of the first fixing bracket 61 can be made larger than that of the second fixing bracket 71. In addition, since a connection area in the coupling portion 62 between the first fixing bracket 61 and the rear cross member 41 is larger, the load transmission capacity of the first fixing bracket 61 can be made larger.

The diameter of the bolt B1 that fastens the fastening portion 63 of the first fixing bracket 61 and the first fixing portion 156 of the cover plate 15 is larger than the diameter of the bolt B2 that fastens the fastening portion 73 of the second fixing bracket 71 and the second fixing portion 158 of the cover plate 15. In other words, a diameter of the bolt hole of the fastening portion 63 of the first fixing bracket 61 is larger than a diameter of the bolt hole of the fastening portion 73 of the second fixing bracket 71. With such a configuration, the first fixing bracket 61 is firmly fixed to the first fixing portion 156 of the cover plate 15. Accordingly, the load-bearing capacity of the first fixing bracket 61 can be increased, and most of the load can be transmitted to the intermediate plate 12.

<First Modification>

Figure 14:
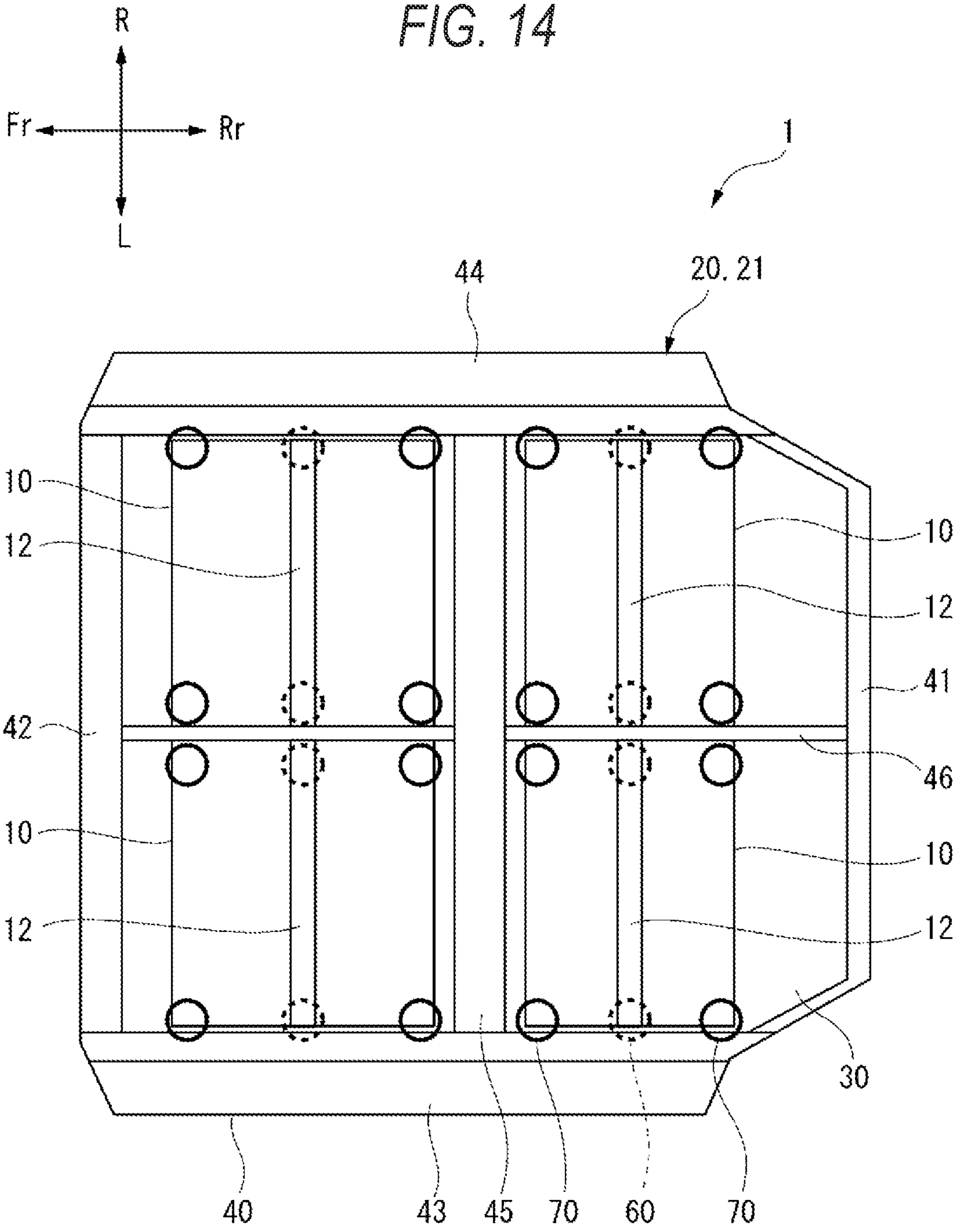
FIG. 14 is a top view of the battery pack 1 in a first modification.

FIG. 14 is a top view of the battery pack 1 in a first modification. Hereinafter, members common to those of the above-described embodiment will be described using common reference numerals.

In the first modification, the four battery modules 10 are disposed such that a plurality of battery cells 11 are laminated in the front-rear direction of the vehicle. Further, a central frame 46 extending in the front-rear direction is provided between two battery modules 10 disposed on the left side and two battery modules 10 disposed on the right side, and the first fixing portion 60 and the second fixing portion 70 are provided on the pair of side frames 43 and 44 and the central frame 46.

In the first modification, since the first fixing portion 60 is disposed at a position overlapped with the intermediate plate 12 having a large load-bearing capacity as viewed in the vehicle width direction, most of a load can be transmitted to the intermediate plate 12. Accordingly, even when a collision load is input from a lateral side of the vehicle V, most of the rotational force T of the pair of side frames 43 and 44 in an inward direction of the battery case 20 can be transmitted to the intermediate plate 12, and the battery module 10 can be protected.

<Second Modification>

Figure 15:
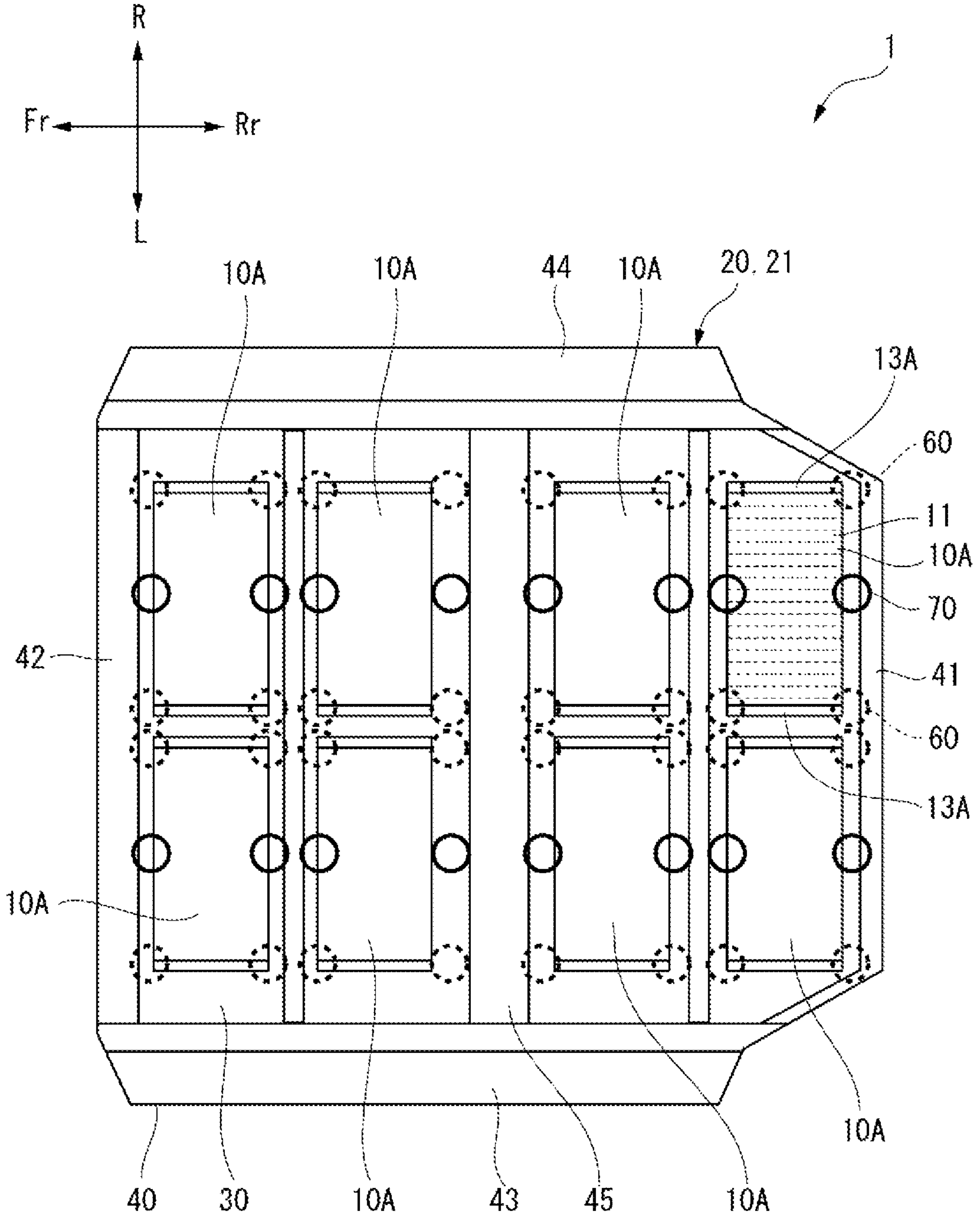
FIG. 15 is a top view of the battery pack 1 in a second modification.

FIG. 15 is a top view of the battery pack 1 in a second modification. Hereinafter, members common to those of the above-described embodiment will be described using common reference numerals.

In the second modification, the battery cells 11 of each of battery modules 10A are square cells. Each of the battery modules 10A includes a pair of end plates 13A at both ends in a lamination direction of the square type battery cells 11. Each of the pair of end plates 13A is a member having a large load-bearing capacity, and is an example of a load-bearing member of the present disclosure.

In the second modification, the first fixing portions 60 provided on the rear cross member 41, the front cross member 42, and the central cross member 45 are provided at positions overlapped with the pair of end plates 13A when viewed from the rear. Further, the second fixing portion 70 is provided at a position overlapped with the battery cell 11 when viewed from the rear.

In the second modification, since the first fixing portions 60 are disposed at positions overlapped with the pair of end plates 13A each having a large load-bearing capacity when viewed from the rear, most of a load can also be transmitted to the pair of end plates 13A. Accordingly, even when a collision load is input from a lateral side of the vehicle V, most of the rotational force T of the frame member 40 in an inward direction of the battery case 20 can be transmitted to the pair of end plates 13A, and the battery module 10A can be protected.

Although an embodiment and modifications of the present disclosure have been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, respective constituent elements in the above embodiments may be freely combined without departing from the gist of the invention.

For example, in the above-described embodiment, the first fixing portion 60 of the battery case 20 fixes the first fixing portion 156 of the cover plate 15 of the battery module 10 to the frame member 40 at the position overlapped with the intermediate plate 12 when viewed from the rear, but the present invention is not limited thereto. For example, the first fixing portion 60 may directly fix the intermediate plate 12 to the frame member 40.

For example, in the above-described embodiment, the upper portion of the first fixing bracket 61 includes the inclined portion 64, but the present invention is not limited thereto, and the inclined portion 64 may not be provided. Since the height of the coupling portion 62 of the first fixing bracket 61 is higher than the height of the coupling portion 72 of the second fixing bracket 71, the load transmission capacity of the first fixing bracket 61 can be larger without providing the inclined portion 64, and the battery module 10 can be protected.

In this specification, at least the following matters are described. In parentheses, the corresponding constituent elements and the like in the above embodiment are shown as an example, but the present invention is not limited thereto.

(1) A battery pack (battery pack 1) to be mounted on a vehicle (vehicle V), the battery back including:

a battery module (battery module 10, 10A) including a plurality of battery cells (battery cells 11) laminated in a first direction of a horizontal direction, and a load-bearing member (intermediate plate 12, a pair of end plates 13A) extending in a second direction, which is orthogonal to the first direction, of the horizontal direction; and a battery case (battery case 20) accommodating the battery module, in which the battery case includes:

a base plate (base plate 30) on which the battery module is placed;

a frame member (frame member 40) joined to an outer edge of the base plate and forming an outer frame of the battery case;

a first fixing portion (first fixing portion 60) provided on the frame member at a position overlapping the load-bearing member when viewed from the second direction, and configured to fix a first part (first fixing portion 156, the intermediate plate 12, the pair of end plates 13A) of the battery module to the frame member; and a second fixing portion (second fixing portion 70) provided on the frame member at a position different from the position overlapping the load-bearing member when viewed from the second direction, and configured to fix a second part (second fixing portion 158) of the battery module to the frame member, a tip end (rear end 301) of the base plate as viewed in a cross section of the outer edge is disposed below the frame member, the frame member includes a vertical wall portion (outer vertical wall portion 413) located outward of the tip end of the base plate, and extending in an upper-lower direction such that the frame member overlaps the tip end of the base plate when viewed from the second direction, and the first fixing portion is configured to have a load transmission capacity to the battery module larger than a load transmission capacity of the second fixing portion when a load in the second direction is applied to the first fixing portion and the second fixing portion, and have a load-bearing capacity larger than a load-bearing capacity of the second fixing portion.

According to the above (1), when a load is input to the battery pack from the second direction due to a collision of the vehicle or the like, a force rotating in an inward direction of the battery pack around the tip end of the base plate is applied to the frame member. Further, since the load transmission capacity and the load-bearing capacity of the first fixing portion are larger than those of the second fixing portion, the first fixing portion receives more rotational force of the frame member than the second fixing portion. Since the first fixing portion is provided at a position overlapped with the load-bearing member when viewed from the second direction, most of the rotational force applied to the frame member can be transmitted from the first fixing portion to the load-bearing member. Thus, the battery module can be protected against the load input to the frame member.

(2) The battery pack according to (1), in which the first fixing portion and the second fixing portion are respectively configured as a first fixing bracket (first fixing bracket 61) and a second fixing bracket (second fixing bracket 71) each extending from the frame member toward the battery module, and in the upper-lower direction, a height of a first coupling portion (coupling portion 62) between the first fixing bracket and the frame member is higher than a height of a second coupling portion (coupling portion 72) between the second fixing bracket and the frame member.

According to the above (2), the load transmission capacity of the first fixing portion can be made larger than the load transmission capacity of the second fixing portion.

(3) The battery pack according to (2), in which the first fixing bracket includes a first fastening portion (fastening portion 63) fastened to the first part of the battery module, and an upper portion of the first fixing bracket includes an inclined portion (inclined portion 64), which is inclined downward from the first coupling portion toward an inner side of the battery case, between the first coupling portion coupling with the frame member and the first fastening portion.

According to the above (3), stress concentration on a part of the first fixing bracket can be prevented, and the load-bearing capacity of the first fixing bracket can be made larger.

(4) The battery pack according to (2) or (3), in which the second fixing bracket includes a second fastening portion (fastening portion 73) fastened to the second part of the battery module, and an upper portion of the second fixing bracket is substantially horizontal from the second coupling portion coupling with the frame member to the second fastening portion.

According to the above (4), the second coupling portion of the second fixing bracket is lower in height than the first coupling portion of the first fixing bracket, and the upper portion of the second fixing bracket is substantially horizontal. Therefore, the load transmission capacity from the second fixing portion to the battery module can be made smaller than the load transmission capacity of the first fixing portion. Thus, the battery module can be protected.

(5) The battery pack according to (2) or (3), in which the first fixing bracket is thicker than the second fixing bracket.

According to the above (5), the load-bearing capacity of the first fixing bracket can be made larger than that of the second fixing bracket.

(6) The battery pack according to any one of (1) to (3), in which the first fixing portion includes a first fastening portion (fastening portion 63) fastened to the first part of the battery module by a first bolt (bolt B1), the second fixing portion includes a second fastening portion (fastening portion 73) fastened to the second part of the battery module by a second bolt (bolt B2), and a diameter of the first bolt is larger than a diameter of the second bolt.

According to the above (6), the first fixing portion and the first part of the battery module are firmly fixed to each other, and most of a load can be received by the first fixing portion.

(7) The battery pack according to any one of (1) to (3), in which the first fixing portion and the second fixing portion are provided integrally with the frame member.

According to the above (7), the number of components can be reduced.

What is claimed is:

1. A battery pack to be mounted on a vehicle, the battery pack comprising:

a battery module including a plurality of battery cells laminated in a first direction of a horizontal direction, and a load-bearing member extending in a second direction, which is orthogonal to the first direction, of the horizontal direction; and a battery case accommodating the battery module, wherein the battery case includes:

a base plate on which the battery module is placed;

a frame member joined to an outer edge of the base plate and forming an outer frame of the battery case;

a first fixing portion provided on the frame member at a position overlapping the load-bearing member when viewed from the second direction, and configured to fix a first part of the battery module to the frame member; and a second fixing portion provided on the frame member at a position different from the position overlapping the load-bearing member when viewed from the second direction, and configured to fix a second part of the battery module to the frame member, a tip end of the base plate as viewed in a cross section of the outer edge is disposed below the frame member, the frame member includes a vertical wall portion located outward of the tip end of the base plate, and extending in an upper-lower direction such that the frame member overlaps the tip end of the base plate when viewed from the second direction, and the first fixing portion is configured to have a load transmission capacity to the battery module larger than a load transmission capacity of the second fixing portion when a load in the second direction is applied to the first fixing portion and the second fixing portion, and have a load-bearing capacity larger than a load-bearing capacity of the second fixing portion.

2. The battery pack according to claim 1, wherein the first fixing portion and the second fixing portion are respectively configured as a first fixing bracket and a second fixing bracket each extending from the frame member toward the battery module, and in the upper-lower direction, a height of a first coupling portion between the first fixing bracket and the frame member is higher than a height of a second coupling portion between the second fixing bracket and the frame member.

3. The battery pack according to claim 2, wherein the first fixing bracket includes a first fastening portion fastened to the first part of the battery module, and an upper portion of the first fixing bracket includes an inclined portion, which is inclined downward from the first coupling portion toward an inner side of the battery case, between the first coupling portion coupling with the frame member and the first fastening portion.

4. The battery pack according to claim 2, wherein the second fixing bracket includes a second fastening portion fastened to the second part of the battery module, and an upper portion of the second fixing bracket is substantially horizontal from the second coupling portion coupling with the frame member to the second fastening portion.

5. The battery pack according to claim 2, wherein the first fixing bracket is thicker than the second fixing bracket in a vertical direction.

6. The battery pack according to claim 1, wherein the first fixing portion includes a first fastening portion fastened to the first part of the battery module by a first bolt, the second fixing portion includes a second fastening portion fastened to the second part of the battery module by a second bolt, and a diameter of the first bolt is larger than a diameter of the second bolt.

7. The battery pack according to claim 1, wherein the first fixing portion and the second fixing portion are provided integrally with the frame member.

* * * * *